(12) United States Patent
Yoshikawa et al.

(10) Patent No.: US 9,758,145 B2
(45) Date of Patent: Sep. 12, 2017

(54) VEHICLE ENERGY MANAGEMENT DEVICE

(71) Applicant: Mitsubishi Electric Corporation, Tokyo (JP)

(72) Inventors: Atsushi Yoshikawa, Tokyo (JP); Takanori Matsunaga, Tokyo (JP); Akinobu Sugiyama, Tokyo (JP); Kohei Mori, Tokyo (JP); Masataka Shirozono, Tokyo (JP); Nobutaka Nakamura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/683,328

(22) Filed: Apr. 10, 2015

(65) Prior Publication Data
US 2015/0329102 A1  Nov. 19, 2015

(30) Foreign Application Priority Data
May 13, 2014 (JP) .................. 2014-099159

(51) Int. Cl.
*B60W 10/06* (2006.01)
*B60W 20/00* (2016.01)
(Continued)

(52) U.S. Cl.
CPC ............ *B60W 10/06* (2013.01); *B60W 10/08* (2013.01); *B60W 20/12* (2016.01); *B60W 20/20* (2013.01);
(Continued)

(58) Field of Classification Search
CPC ...... B60W 10/06; B60W 10/08; B60W 20/12; B60W 20/15; B60W 20/20; B60W 30/182;
(Continued)

(56) References Cited

U.S. PATENT DOCUMENTS 8,645,052 B2   2/2014  Pryakhin et al.
2006/0161334 A1  7/2006  Teramae
(Continued)

FOREIGN PATENT DOCUMENTS

EP   2368751 A2   9/2011
JP   2001-69605 A  3/2001
(Continued)

OTHER PUBLICATIONS

Communication dated Jul. 7, 2015, issued by the Japan Patent Office in corresponding Japanese Application No. 2014-099159.

*Primary Examiner* — Aaron L Troost
(74) *Attorney, Agent, or Firm* — Sughrue Mion, PLLC; Richard C. Turner

(57) ABSTRACT

A vehicle energy management device includes: an energy consumption related information acquisition unit which acquires energy consumption related information that is information related to energy consumption of an own vehicle in each of traveling sections; an energy consumption related information correction unit which corrects the energy consumption related information; and a control plan production unit which produces a control plan for vehicle instruments based on an estimated value of an energy consumption amount of each of the vehicle instruments calculated by using the corrected energy consumption related information. The energy consumption related information correction unit corrects the energy consumption related information based on a result of comparing an actually measured value of traveling characteristics of the own vehicle in each of the road categories and a statistical result of traveling characteristics of a plurality of general vehicles in each of the traveling sections.

16 Claims, 4 Drawing Sheets

(51) Int. Cl.
  *B60W 30/182* (2012.01)
  *G01C 21/36* (2006.01)
  *B60W 50/00* (2006.01)
  *B60W 40/12* (2012.01)
  *G07C 5/00* (2006.01)
  *B60W 20/20* (2016.01)
  *B60W 10/08* (2006.01)
  *B60W 20/12* (2016.01)

(52) U.S. Cl.
  CPC .......... *B60W 30/182* (2013.01); *B60W 40/12* (2013.01); *B60W 50/0097* (2013.01); *G01C 21/3697* (2013.01); *B60W 2050/0077* (2013.01); *B60W 2050/0089* (2013.01); *G07C 5/008* (2013.01); *Y02T 10/6286* (2013.01); *Y10S 903/93* (2013.01)

(58) Field of Classification Search
  CPC ............ B60W 40/12; B60W 50/0097; B60W 2050/0077; B60W 2050/0089; G01C 21/3697; G07C 5/008; Y10S 903/93
  USPC ........................................................... 701/22
  See application file for complete search history.

(56) References Cited

U.S. PATENT DOCUMENTS

| | | | | |
|---|---|---|---|---|
| 2011/0196817 | A1* | 8/2011 | Pryakhin | G01C 21/26 706/14 |
| 2011/0246004 | A1* | 10/2011 | Mineta | B60W 20/12 701/22 |
| 2013/0173084 | A1 | 7/2013 | Tagawa et al. | |
| 2015/0039169 | A1* | 2/2015 | Dextreit | B60W 50/0097 701/22 |
| 2015/0120107 | A1* | 4/2015 | Yu | B60L 11/126 701/22 |
| 2015/0344036 | A1* | 12/2015 | Kristinsson | B60W 40/06 701/22 |
| 2016/0033294 | A1* | 2/2016 | Sanami | B60K 6/445 701/22 |

FOREIGN PATENT DOCUMENTS

| | | |
|---|---|---|
| JP | 2005218178 A | 8/2005 |
| JP | 2006184232 A | 7/2006 |
| JP | 2009223460 A | 10/2009 |
| JP | 2011162181 A | 8/2011 |
| JP | 4918076 B2 | 4/2012 |
| JP | 2013140057 A | 7/2013 |

* cited by examiner

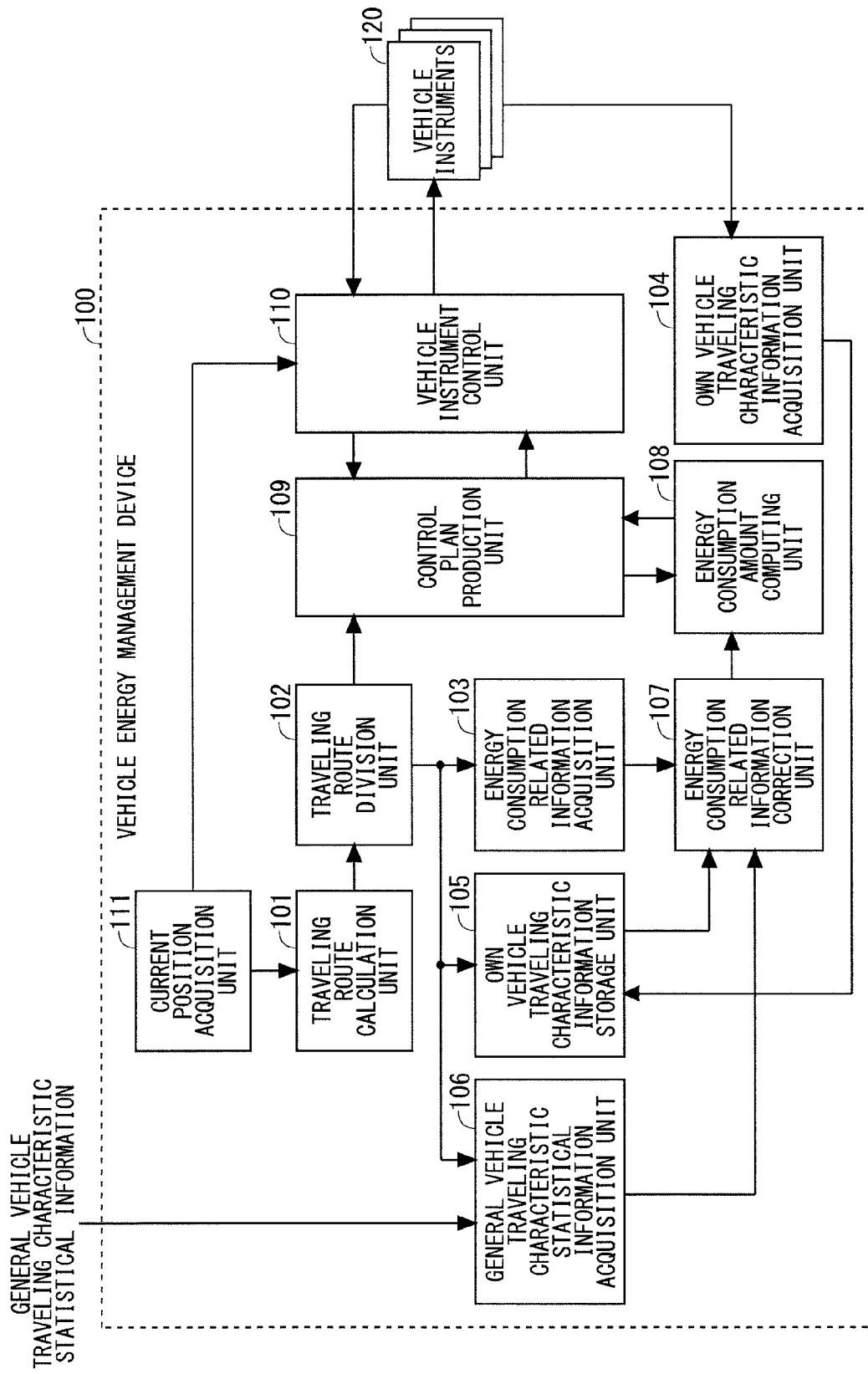
F I G. 2

VEHICLE ENERGY MANAGEMENT DEVICE

BACKGROUND OF THE INVENTION

Field of the Invention

The present invention relates to a vehicle energy management device that manages a plurality of energy sources of a vehicle such as fuel energy and electrical energy.

Description of the Background Art

In an engine vehicle, an electric vehicle (EV), a hybrid electric vehicle (HEV), a fuel cell electric vehicle and the like, an energy consumption amount is suppressed by so-called sequential control of changing vehicle operation modes corresponding to information indicating a current vehicle state which is obtained from an in-vehicle sensor and the like. For example, as operation modes of the hybrid electric vehicle, there are a mode of traveling only by power of an engine, a mode of traveling only by power of a motor, a mode of traveling by using both of the power of the engine and the power of the motor, a mode of generating electricity by the power of the engine to accumulate the generated electricity in a battery or to use the generated electricity for driving the motor, and so on.

Moreover, a technology of producing a control plan (a switching plan of the operation modes) for the vehicle in consideration of not only the current vehicle state but also an estimated vehicle state in the future is under development. For example, in a case where it is estimated that the hybrid electric vehicle continuously travels uphill and downhill, efficient control becomes possible such as sufficiently charging a battery in advance before the uphill, allowing the vehicle to travel uphill by the power of the motor to increase a vacant capacity of the battery, and charging the battery with regenerative electric power obtained on the subsequent downhill.

For example, Japanese Patent Application Laid-Open No. 2001-69605 discloses a technology of calculating changes of an altitude of a traveling route of a vehicle (hybrid electric vehicle) and changes of a vehicle speed during a traveling time from a current position and traveling route of the vehicle, terrain information, a congestion degree of a road, and the like, producing a plan for regulating upper and lower limits of a state of charge (SOC) of a battery and controlling the vehicle along the plan. However, in the technology of Japanese Patent Application Laid-Open No. 2001-69605, it is difficult to highly accurately obtain an optimum controlled variable of the vehicle from map data information indicating the altitude and the terrain. Moreover, such map data and traffic information are not sufficiently detailed in some case, and further, traveling characteristics (a speed of the vehicle, a magnitude of acceleration thereof, a frequency of acceleration/deceleration thereof, a frequency of stops thereof, and the like) of the vehicle also depend on a driver, and accordingly, an error between an estimated value and an actual value of the energy consumption amount is prone to become large.

Japanese Patent No. 4918076 discloses a control device of a hybrid vehicle in order to solve this problem. In Japanese Patent No. 4918076, information of traveling characteristics when another vehicle traveled on a traveling route of an own vehicle in the past is acquired, and a control plan for the own vehicle is produced based on the information.

In a system of Japanese Patent No. 4918076, it is necessary for each of the vehicles or an external information server to hold information such as a variation of the vehicle speed and an average gradient of a road for each section on the traveling route. However, in particular, detailed information of the variation of the vehicle speed becomes enormous in terms of a data amount, and accordingly, it is considered difficult to put this system into practical use. For example, construction of a database for handling such enormous data, development of communication means for distributing the enormous data, and further, a cost required for infrastructure improvement for realizing these become large problems.

Moreover, the technology of Japanese Patent No. 4918076 is one that makes most use of the traveling (EV traveling) only by the motor, and is considered not to be capable of implementing energy optimization (for example, optimization of engine efficiency) corresponding to a purpose. Further, since the traveling characteristics of the vehicle also depend on the driver, an energy consumption amount for each section also changes depending on the driver, and is not determined uniquely. Hence, the control plan for realizing the optimization of the energy consumption on the entire traveling route differs for each individual vehicle.

SUMMARY OF THE INVENTION

It is an object of the present invention to provide a vehicle energy management device capable of realizing energy control corresponding to traveling characteristics of each individual vehicle by using information with a small data amount.

A vehicle energy management device according to the present invention is used in a vehicle including a plurality of vehicle instruments driven by different energy sources. The vehicle energy management device includes a traveling route calculation unit, a traveling route division unit, an energy consumption related information acquisition unit, an energy consumption related information correction unit, an energy consumption amount computing unit, a control plan production unit, and a vehicle instrument control unit, which will be described below.

The traveling route calculation unit calculates a traveling route of the vehicle. The traveling route division unit divides the traveling route into a plurality of traveling sections, and sets for each of the traveling sections a road category corresponding to road characteristics of each of the traveling sections. The energy consumption related information acquisition unit acquires energy consumption related information that is information related to energy consumption of the vehicle in each of the traveling sections. The energy consumption related information correction unit acquires own vehicle traveling characteristic information that is an actually measured value of traveling characteristics when the vehicle travels on a road of each road category and general vehicle traveling characteristic statistical information that is a statistical result of traveling characteristics when a plurality of general vehicles travels on the road of each road category, and corrects the energy consumption related information of each of the traveling sections based on a result of comparing the own vehicle traveling characteristic information and the general vehicle traveling characteristic statistical information of each of the traveling sections. The energy consumption amount computing unit calculates an estimated value of an energy consumption amount by each of the plurality of vehicle instruments when the vehicle travels in each of the traveling sections, based on the corrected energy consumption related information. The control plan production unit produces a control plan for the plurality of vehicle instruments for each of the traveling sections based on the estimated value of the energy consumption amount by each of the plurality of vehicle instruments in each of the traveling sections. The vehicle instrument control unit controls the plurality of vehicle instruments according to the control plan.

In the vehicle energy management device according to the present invention, the energy consumption related information of each of the traveling sections is corrected based on the result of comparing the own vehicle traveling characteristic information and the general vehicle traveling characteristic statistical information of each of the traveling sections. Therefore, the corrected energy consumption related information conforms to actual traveling characteristics of the vehicle (own vehicle) having the vehicle energy management device mounted thereon. Hence, highly accurate energy control corresponding to characteristics for each driver of the own vehicle becomes possible. Moreover, the general vehicle traveling characteristic statistical information is the statistical result obtained by statistically processing the traveling characteristic information of a large number of the general vehicles for each road category, and a data amount thereof is suppressed to be small.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a block diagram showing a configuration of the vehicle energy management device according to the preferred embodiment;

DESCRIPTION OF THE PREFERRED
EMBODIMENTS

Figure 1:
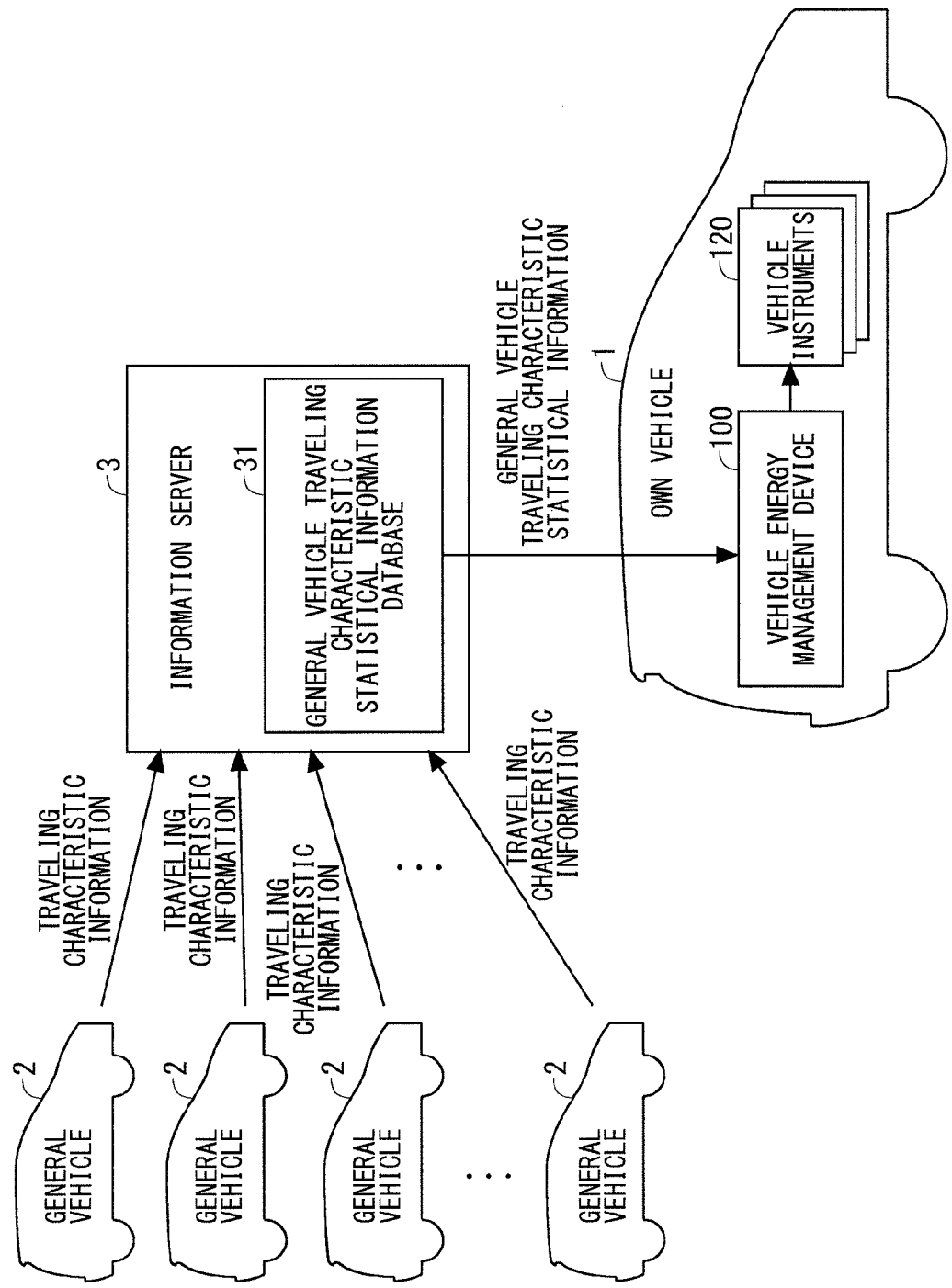
FIG. 1 is a block diagram showing an entire configuration of a vehicle energy management system according to a preferred embodiment of the present invention.

FIG. 1 is a block diagram showing an entire configuration of a vehicle energy management system according to a preferred embodiment of the present invention. The system includes a vehicle 1 (hereinafter, an "own vehicle 1") having a vehicle energy management device 100 according to the present invention mounted thereon, an unspecified large number of vehicles 2 (hereinafter, "general vehicles 2"); and an information server 3. The present invention is widely applicable to operation control of the own vehicle 1 having two or more energy sources, but here, it is assumed that the own vehicle 1 is a hybrid electric vehicle that uses two types of energy, which are fuel energy and electrical energy, as power sources.

Each of the general vehicles 2 has a function to transmit, to the information server 3, traveling characteristic information that is an actually measured value of traveling characteristics (magnitudes of a speed and acceleration, a frequency of acceleration/deceleration, a frequency of stops, and the like) at a time of traveling on each road. The information server 3 statistically processes the traveling characteristic information received from the plurality of general vehicles 2 while classifying the traveling characteristic information for each road category, and creates general vehicle traveling characteristic statistical information indicating a result (statistical result) of this statistical processing. Although details will be described later, the "road category" mentioned here are those obtained by classifying each road corresponding to characteristics thereof, such as a "general road," an "automobile exclusive road," and an "expressway."

The created general vehicle traveling characteristic statistical information is stored in a general vehicle traveling characteristic statistical information database 31 for each road category. The general vehicle traveling characteristic statistical information that the general vehicle traveling characteristic statistical information database 31 stores may be updated whenever necessary. Note that traveling characteristic information of the own vehicle 1 may also transmit as the information of one of the plurality of general vehicles 2 to the information server 3.

In this preferred embodiment, an average value and a dispersion value are used as the statistical result of each piece of the information. A weighted average efficiency, a median value and the like may be used in place of the average value. Moreover, a definition formula of the dispersion value may be arbitrary; however, in this preferred embodiment, assuming that a distribution of each piece of the data is a normal distribution, the dispersion value is to be represented by a standard deviation (a).

Examples of the general vehicle traveling characteristic statistical information are prior information that is related to the traveling characteristics of the general vehicles 2 and that has not been used in HEV control up to now, and include information (general vehicle average vehicle speed statistical information) indicating a statistical result of an average vehicle speed for the plurality of general vehicles 2, information (general vehicle acceleration dispersion statistical information) indicating a statistical result of a dispersion value of acceleration for the plurality of general vehicles 2, and information (general vehicle stop state statistical information) indicating a statistical result of a frequency or number of stops for the plurality of general vehicles 2.

Note that the average vehicle speed of a vehicle may be an average value of a vehicle speed including a stopped state, or may be an average value of a vehicle speed excluding a stopped state. Moreover, the acceleration dispersion value of a vehicle may be defined while being classified for each of vehicle speed ranges so as to change depending on the vehicle speed ranges, or may be defined without being classified for each of vehicle speed ranges so as to become a constant value irrespective of the vehicle speed ranges. However, the definitions of the average vehicle speed and the acceleration dispersion value should be made common to the own vehicle 1 and the general vehicles 2.

As described above, each individual piece of the general vehicle traveling characteristic statistical information is obtained by statistically processing the traveling characteristic information of the plurality of general vehicles 2 for each road category, and is expressed by the average value and the dispersion value (standard deviation) of the traveling characteristic information of the plurality of general vehicles 2. The number of types of the road categories is far smaller than the number of roads (or sections) included in a road network, and accordingly, an amount of data to be stored in the database is reduced to a large extent in comparison with that in a method of accumulating the results of statistically processing the traveling characteristic information of the plurality of general vehicles 2 for each road. This preferred embodiment adopts a configuration in which the general vehicle traveling characteristic statistical information database 31 is arranged in the information server 3 outside of the own vehicle 1; however, it is well possible to utilize such a reduction effect of the data amount to arrange inside of the own vehicle 1 a storage device which includes the general vehicle traveling characteristic statistical information database 31.

The vehicle energy management device 100 which the own vehicle 1 includes acquires the general vehicle traveling characteristic statistical information corresponding to each road on a traveling route (scheduled traveling route) of the own vehicle 1 from the general vehicle traveling characteristic statistical information database 31 of the information server 3, and controls vehicle instruments 120 which the own vehicle 1 includes, such as a motor (electric motor), an engine, and a generator (electric generator), in consideration of the general vehicle traveling characteristic statistical information. The motor can function as an electric generator (regenerative brake) which regenerates electric power, at a time when the vehicle is decelerated.

FIG. 2 is block diagram showing a configuration of the vehicle energy management device 100. As in FIG. 2, the vehicle energy management device 100 includes a traveling route calculation unit 101, a traveling route division unit 102, an energy consumption related information acquisition unit 103, an own vehicle traveling characteristic information acquisition unit 104, an own vehicle traveling characteristic information storage unit 105, a general vehicle traveling characteristic statistical information acquisition unit 106, an energy consumption related information correction unit 107, an energy consumption amount computing unit 108, a control plan production unit 109, a vehicle instrument control unit 110, and a current position acquisition unit 111. Moreover, the vehicle energy management device 100 is configured by using a computer, and the above-described respective elements are realized in such a manner that the computer operates according to a program.

The traveling route calculation unit 101 calculates a traveling route from a start point of the own vehicle 1 to a destination (arrival point) thereof by using map data. The traveling route calculation unit 101 can also calculate a departure time from the start point and an estimated arrival time to the destination, in addition to the traveling route. Here, it is assumed that information of the traveling route of the own vehicle 1 which the traveling route calculation unit 101 outputs includes road characteristic information indicating characteristics (road characteristics) of each road included in the traveling route of the own vehicle 1. The road characteristics include, for example, a road type (a general road, an automobile exclusive road, an expressway and the like), altitude information (that is, gradient information), a road width, curvature of a curve, presence of a branch point, and speed information (estimated speed information) indicating an expected flow (vehicle speed range) of a vehicle on each road. The road type may be further subdivided into a road in an urban district, a road in a suburb district, a road in a mountainous district, and the like, corresponding to a region through which a road passes.

Moreover, the road type may be one that changes by external factors such as time and weather. For example, the road characteristics of each road may change to a "road in morning," a "road in daytime," a "road at night" and the like, corresponding to a time period, or may change to a "road under fine weather," a "rainy road," and a "snowy road" and the like, corresponding to the weather.

Further, the road type may be defined by energy consumption related information and the general vehicle traveling characteristic statistical information, which will be described later. For example, information such as a "road where an energy consumption amount is large," a "road where the average vehicle speed of the general vehicles is high" and a "road where the average vehicle speed of the general vehicles is low" may be defined as the road characteristics.

The traveling route calculation unit 101 may be one that does not calculate the traveling route, departure time, estimated arrival time and the like of the own vehicle 1 by itself but acquires those pieces of information calculated by an external navigation device. In that case, map data and road characteristic information which the navigation device holds can be used, and accordingly, it is not necessary for the traveling route calculation unit 101 to store those pieces of information. Further, as the map data and the road characteristic information, for example, those distributed from a map service company and the like may be used.

The traveling route division unit 102 divides the traveling route calculated by the traveling route calculation unit 101 into a plurality of sections. As a method in which the traveling route division unit 102 divides the traveling route into the plurality of sections, for example, there are considered a method of dividing the traveling route for each road type, a method of dividing the traveling route for each fixed distance; a method of dividing the traveling route for each estimated traveling distance during a fixed time, a method of dividing the traveling route by branch points of the road, a method of combining two or more thereof; or the like. Moreover, there is also considered a method of dividing the traveling route for each of broad road characteristics (the road type and the like) and subsequently further dividing a section with a fixed length or more into a plurality of sections based on detailed road characteristic information. For example, it is good to extract a road with a steep upgrade or downgrade, a road on which curvature of a curve is large, a road on which a vehicle speed range is high or low, and the like from the sections obtained by the broad division, and to divide the extracted one into fine sections.

Moreover, assuming that the road characteristics of each road changes by the external factors such as the time and the weather, the traveling route may be divided based on a time period and weather when the own vehicle 1 travels. For example, the traveling route may be divided for each time period when the own vehicle 1 is estimated to travel, or the traveling route may be divided every weather estimated when the own vehicle 1 travels.

Moreover, the energy consumption related information, the general vehicle traveling characteristic statistical information and the like, which will be described later, may be acquired before dividing the traveling route of the own vehicle 1, and the traveling route may be divided by taking those pieces of information as references. For example, it is considered to divide the traveling route into a section in which an energy consumption amount per unit distance is large and a section in which the energy consumption amount is small, to divide the traveling route into a section in which the average vehicle speed of the general vehicles is higher than a predetermined value and a section in which the average vehicle speed of the general vehicles is lower than the predetermined value, and so on.

Hereinafter, the respective sections obtained in such a manner that the traveling route division unit 102 divides the traveling route are referred to as "traveling sections."

The traveling route division unit 102 further sets for each of the traveling sections a road category corresponding to road characteristics of each of the traveling sections. The road category is assigned to each of the traveling sections, whereby the plurality of the traveling sections is classified for each of the road characteristics thereof.

As mentioned above, the road characteristics are defined by a type, altitude, and gradient of a road, a road width, presence of a branch point, curvature of a curve, an estimated vehicle speed range, weather and a time period during a traveling time, and the like. The way of defining the road category may be arbitrary, and for example, in a case of defining the road category by the road type, the road category such as a "general road," an "automobile exclusive road" and an "expressway" is set for each of the traveling sections by the traveling route division unit 102. Moreover, for example, in a case of defining the road category by the gradient (altitude difference) of a road, the road category such as an "uphill," a "downhill" and a "flat road" is set for each of the traveling sections. Usually, the number of the types of the road categories becomes far smaller than the number of the traveling sections; however, the road category may be subdivided to the same extent as that of the traveling sections. In that case, an amount of the information handled by the system is increased; however, the characteristics of each road can be obtained as more detailed information, and accordingly, it becomes possible to highly accurately estimate the energy consumption amount of the vehicle in each of the traveling sections.

The energy consumption related information acquisition unit 103 acquires information (energy consumption related information) related to the energy consumption of the own vehicle 1 on the traveling route of the own vehicle 1 calculated by the traveling route calculation unit 101. For example, the energy consumption related information is information that can affect the energy consumption amount of the own vehicle 1 on the traveling route, such as the road characteristic information (gradient information, a road type, a road width, curvature of a curve, estimated speed information, and the like) included in the information of the traveling route, congestion information which an information distribution service such as VICS (registered trademark) (Vehicle Information and Communication System) distributes, and vehicle speed information (actually measured speed information) indicating an actual flow (vehicle speed range) of a vehicle, and radar information which an advanced driving assistance system (for example, a collision prevention safety device) called ADAS (Advanced Driver Assistance System) acquires.

Further, as the energy consumption related information, there are also considered weather information (weather, a temperature, humidity, solar irradiance, and the like), supply and demand information of an energy network (for example, electric networks (grids) for residences, factories, buildings and the like) of an infrastructure, and the like. As the supply and demand information of the energy network of the infrastructure, for example, there is a supply and demand plan of electric power, which energy management systems (EMS) for the residences, the factories, the buildings and the like create. These pieces of information do not directly affect an energy amount (energy consumption amounts of the engine and the motor) required for the traveling of the vehicle, but affect an energy amount that can be consumed for driving the engine and the motor.

The own vehicle traveling characteristic information acquisition unit 104 actually measures the traveling characteristics of the own vehicle 1 during the own vehicle 1 actually travels on the road, and acquires own vehicle traveling characteristic information indicating the actually measured value. Examples of the own vehicle traveling characteristic information are prior information that is related to the traveling characteristics of the own vehicle 1 and that has not been used for the HEV control up to now, and include information (own vehicle average vehicle speed information) indicating an average vehicle speed of the own vehicle 1, information (own vehicle acceleration dispersion information) indicating a dispersion value of acceleration of the own vehicle 1, and information (own vehicle stop state information) indicating a frequency or number of stops of the own vehicle 1.

The own vehicle traveling characteristic information acquired by the own vehicle traveling characteristic information acquisition unit 104 is stored in the own vehicle traveling characteristic information storage unit 105 for each road category. That is to say, the own vehicle traveling characteristic information storage unit 105 functions as a database for the own vehicle traveling characteristic information acquired by the own vehicle traveling characteristic information acquisition unit 104 in the past. The own vehicle traveling characteristic information storage unit 105 does not necessarily have to be built in the vehicle energy management device 100 as long as being mounted on the own vehicle 1. That is to say, the own vehicle traveling characteristic information storage unit 105 may be a storage device externally attached to the vehicle energy management device 100.

Moreover, when the traveling route of the own vehicle 1 is divided into the plurality of traveling sections by the traveling route division unit 102 and the road category is set for each of the traveling sections, the own vehicle traveling characteristic information storage unit 105 inputs the own vehicle traveling characteristic information of the road category set for each of the traveling sections to the energy consumption related information correction unit 107.

The general vehicle traveling characteristic statistical information acquisition unit 106 is communication means for acquiring the general vehicle traveling characteristic statistical information from the information server 3. When the traveling route of the own vehicle 1 is divided into the plurality of traveling sections by the traveling route division unit 102 and the road category is set for each of the traveling sections, the general vehicle traveling characteristic statistical information acquisition unit 106 acquires the general vehicle traveling characteristic statistical information of the road category set for each of the traveling sections from the information server 3. The general vehicle traveling characteristic statistical information acquired by the general vehicle traveling characteristic statistical information acquisition unit 106 is input to the energy consumption related information correction unit 107.

The energy consumption related information correction unit 107 compares the own vehicle traveling characteristic information of each road category input from the own vehicle traveling characteristic information storage unit 105 and the general vehicle traveling characteristic statistical information of each road category input from the general vehicle traveling characteristic statistical information acquisition unit 106, and obtains a difference between the traveling characteristics of the own vehicle 1 and the traveling characteristics (average traveling characteristics of the plurality of general vehicles 2) of the general vehicles 2 in each road category. Then, based on the difference, the energy consumption related information correction unit 107 corrects the energy consumption related information of each of the traveling sections acquired by the energy consumption related information acquisition unit 103. That is to say, the energy consumption related information correction unit corrects contents of the energy consumption related information of each of the traveling sections so as to make the contents approximated to the traveling characteristics of the own vehicle 1 in the road category set for each of the traveling sections. The corrected energy consumption related information is input to the energy consumption amount computing unit 108.

For example, in a case where, in a certain road category, a value (an average vehicle speed of the own vehicle 1) of the own vehicle average vehicle speed information is larger than the average value (the average value of the average vehicle speed of the plurality of general vehicles 2), the energy consumption related information correction unit 107 corrects the energy consumption related information so as to increase a value of the estimated speed information of the traveling section for which the road category is set. In a case where a magnitude relationship between the value of the own vehicle average vehicle speed information and the average value which the general vehicle average vehicle speed statistical information indicates is an inverse relationship to the above, the energy consumption related information is corrected so as to reduce the value of the estimated speed information.

Moreover, for example, in a case where, in a certain road category, the own vehicle acceleration dispersion information (an acceleration dispersion value of the own vehicle 1) is larger than an average value (an average value of the acceleration dispersion values of the plurality of general vehicles 2) which the general vehicle acceleration dispersion statistical information indicates, the energy consumption related information correction unit 107 corrects the energy consumption related information such that the dispersion value of the vehicle speed in the estimated speed information of the traveling section for which the road category is set becomes large by increasing an absolute value of a gradient of vehicle speed variation in the estimated speed information, by increasing a frequency of the vehicle speed variation, or by increasing the range of the vehicle speed variation. In a case where a magnitude relationship between the own vehicle acceleration dispersion information and the average value which the general vehicle acceleration dispersion statistical information indicates is an inverse relationship to the above, the energy consumption related information is corrected so as to reduce the dispersion value of the vehicle speed in the estimated speed information.

Under an instruction from the control plan production unit 109, the energy consumption amount computing unit 108 calculates an estimated value of the energy consumption amount in each of the traveling sections included in the traveling route of the own vehicle 1, that is, an energy amount (required traveling energy amount) required for the own vehicle 1 to completely travel through each of the traveling sections, by using the energy consumption related information corrected by the energy consumption related information correction unit 107. The required traveling energy amount can be calculated by using a predetermined numerical formula and characteristic data.

Examples of such a numerical formula include a physical formula for calculating the required traveling energy amount from a road gradient and estimated speed information of each road included in the traveling route and from vehicle specification information (a vehicle weight, a rolling resistance factor, and the like) and a conversion formula for converting the required traveling energy amount into an amount of fuel required to drive the engine, into an amount of electric power required to drive the motor, or into amounts of fuel and electric power required when both of the engine and the motor are combined. Moreover, examples of the characteristic data include a data map indicating characteristics such as a torque, engine output and a fuel consumption amount with respect to the number of revolutions of the engine.

Prior to and during the traveling of the own vehicle 1, the control plan production unit 109 produces a control plan for the vehicle instruments 120 (the motor, the engine, the generator and the like) such that the energy consumption amount (a fuel consumption amount and an electric power consumption amount) of the own vehicle 1 in the entire traveling route satisfies a predetermined condition. Specifically, the control plan production unit 109 assigns an operation mode of the own vehicle 1 for each of the traveling sections such that the energy consumption amount of the own vehicle 1 in the entire traveling route satisfies the predetermined condition.

As the condition taken as a reference for defining the operation mode, for example, there are considered a condition where the energy consumption amount in the entire traveling route becomes most approximated to a specific target value, a condition for keeping a state of charge (SOC) of a battery at an arrival time at the destination within a desired range, a condition where the fuel consumption amount becomes minimum or maximum, a condition where a generation amount of $CO_2$ becomes minimum, and a condition where costs of fuel and electric power (which may include costs of refueling and charging before the traveling) become minimum.

Since the energy consumption amount of the vehicle changes depending on the operation mode, the control plan production unit 109 calculates the required traveling energy amount of each of the traveling sections while classifying the required traveling energy amount for each of the operation modes by using the energy consumption amount computing unit 108, and selects a combination of the operation modes of the respective traveling sections such that the energy consumption amount of the own vehicle 1 on the entire traveling route satisfies the predetermined condition. This assignment of the operation mode for each of the traveling sections determined by the control plan production unit 109 is the control plan for the vehicle instruments 120. The control plan production unit 109 inputs the created control plan for the vehicle instruments 120 to the vehicle instrument control unit 110.

The vehicle instrument control unit 110 controls the vehicle instruments 120 according to the control plan (the assignment of the operation mode of each of the traveling sections) for the vehicle instruments 120 input from the control plan production unit 109, and performs switching between the operation modes. Note that the switching between the operation modes is usually performed when the own vehicle 1 enters a new traveling section; however, as will be described later, there is also a case where the control plan for the vehicle instruments 120 is changed (re-planned) during a traveling time or a case where the driver performs an operation against expectation and thus it becomes impossible to maintain the operation mode according to the control plan, and in such a case, the switching between the operation modes is executed even in the middle of the traveling section.

Moreover, the vehicle instrument control unit 110 also has a function to perform feedback control of comparing an actual energy consumption amount (an actually measured value of the energy consumption amount) in each of the vehicle instruments 120 operated based on the control plan, and an energy consumption amount (an estimated value of the energy consumption amount) of each of the traveling sections, which is calculated when the control plan production unit 109 creates the control plan, and to correct operation mode parameters (an output ratio of the engine and the motor, intensity of electric power regeneration, and the like) so as to reduce a difference between both of the above-described energy consumption amounts.

Meanwhile, the control plan production unit 109 re-produces the control plan for the vehicle instruments 120 in a case where a magnitude of the difference or a variation of the difference between the estimated value and the actually measured value of the energy consumption amount exceeds a predetermined threshold, or in a case where the own vehicle 1 deviates from the planned traveling route (the traveling route calculated by the traveling route calculation unit 101) and the traveling route calculation unit 101 changes the traveling route. Further, the control plan production unit 109 re-produces the control plan for the vehicle instruments 120 also in a case where a user issues an instruction to change the control plan for the vehicle instruments 120.

The current position acquisition unit 111 calculates the current position of the own vehicle 1 from an absolute position (latitude and longitude) of the own vehicle 1 acquired from a GPS (Global Positioning System), and from a relative position found out from information (sensor information) acquired by a speed sensor and an orientation sensor of the own vehicle 1. The current position of the own vehicle 1 calculated by the current position acquisition unit 111 is used for processing in which the traveling route calculation unit 101 calculates the traveling route, processing in which the vehicle instrument control unit 110 determines a traveling section where the own vehicle 1 is present.

Figure 3:
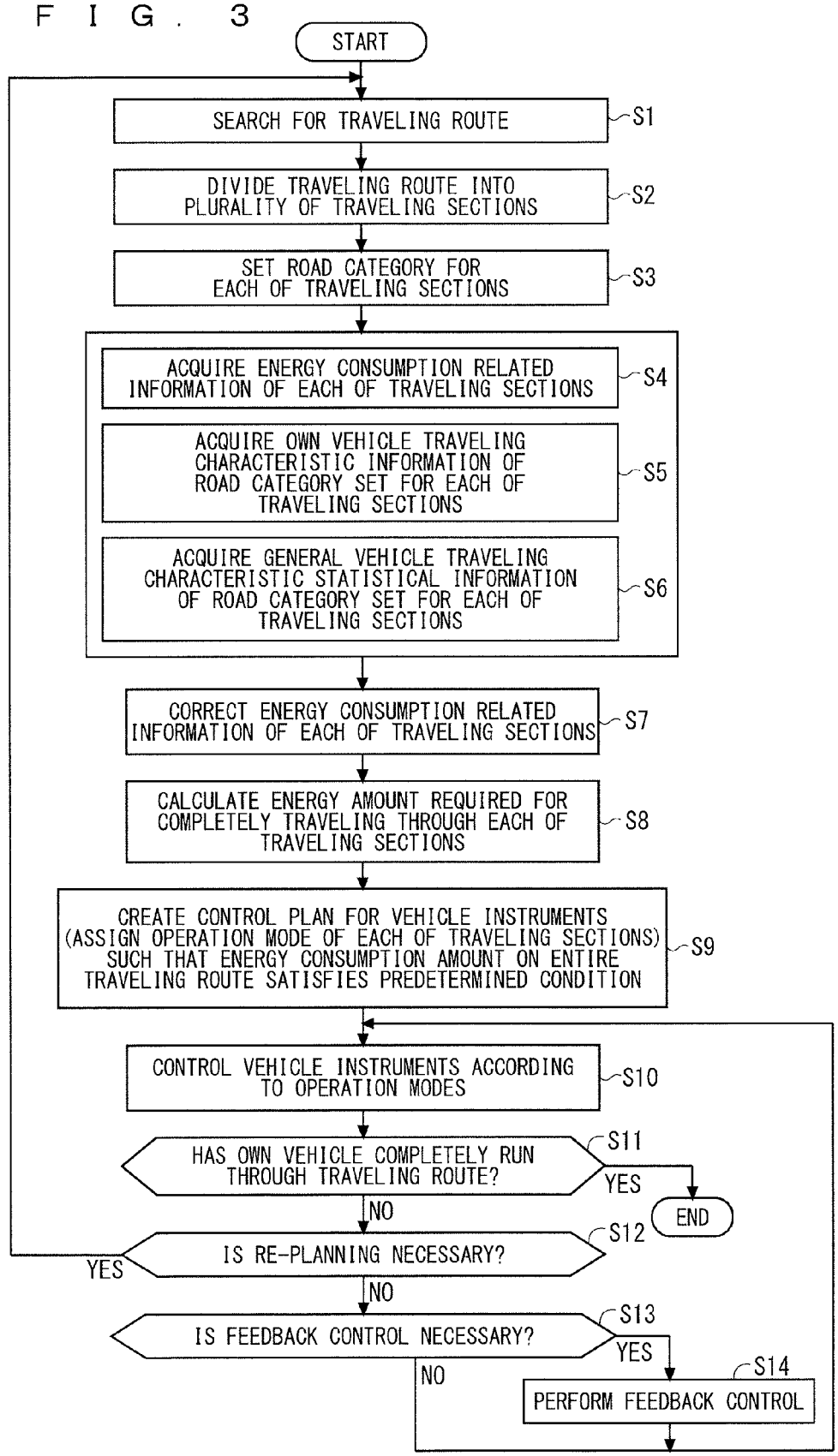
FIG. 3 is a flowchart showing an operation of the vehicle energy management device according to the preferred embodiment.

Next, operations of the vehicle energy management device 100 will be described. FIG. 3 is a flowchart showing the operations of the vehicle energy management device 100.

When an operation flow of the vehicle energy management device 100 starts with starting of a vehicle (or an in-vehicle system), the traveling route calculation unit 101 first searches for the traveling route from the current point of the own vehicle 1 to a set destination (step S1). The user of the vehicle may perform the setting of the destination by using a user interface, or the traveling route calculation unit 101 may automatically perform the setting by estimating the destination from a past traveling history or the like.

When the traveling route of the own vehicle 1 is determined, the traveling route division unit 102 divides the traveling route into the plurality of traveling sections in consideration of the map data and the road characteristic information (step S2). Further, the traveling route division unit 102 sets for each of the traveling sections the road category corresponding to road characteristics of each of the traveling sections (step S3).

Figure 4:
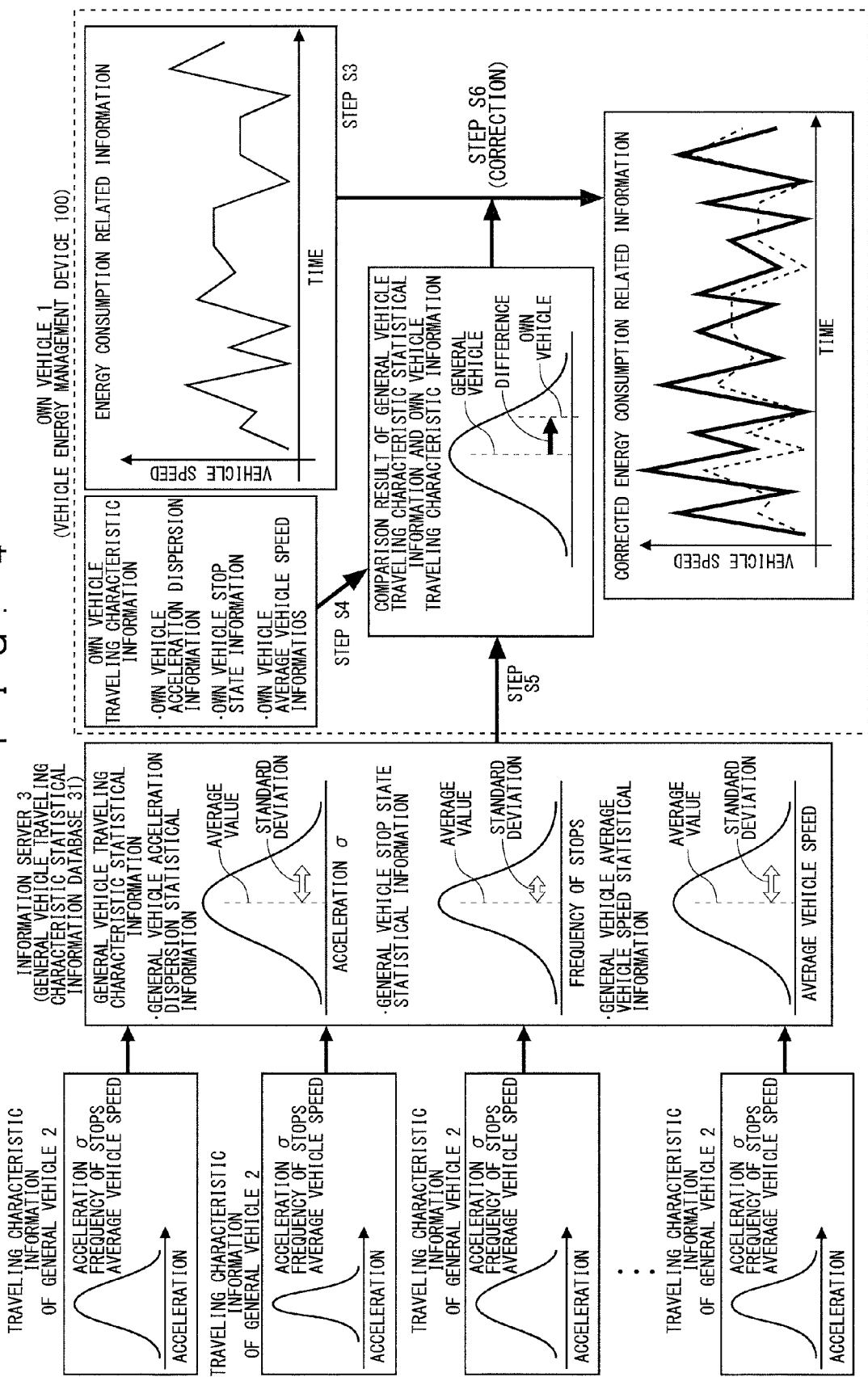
FIG. 4 is a view conceptually showing correction processing for energy consumption related information.

When the division of the traveling route is completed, processing of steps S4 to S7, which will be described below, is performed. Steps S4 to S7 will be described with the reference to FIG. 4. FIG. 4 is a view conceptually showing correction processing for the energy consumption related information.

As shown in FIG. 4, the information server 3 stores the general vehicle traveling characteristic statistical information created by receiving the traveling characteristic information of the plurality of general vehicle 2 and by statistically processing the received traveling characteristic information for each road category, in the general vehicle traveling characteristic statistical information database 31 in advance. As shown in FIG. 4, examples of the general vehicle traveling characteristic statistical information include the general vehicle average vehicle speed statistical information that is the statistical result of the average vehicle speed for the plurality of general vehicles 2, the general vehicle acceleration dispersion statistical information that is the statistical result of the dispersion value (standard deviation) of the acceleration for the plurality of general vehicles 2, and the general vehicle stop state statistical information that is the statistical result of the frequency of the stops for the plurality of general vehicles 2.

Steps S4 to S6 are executed independently of one another. In step S4, the energy consumption related information acquisition unit 103 acquires the energy consumption related information in each of the traveling sections on the traveling route. In FIG. 4, an estimated value (estimated speed information) of hourly transition of the vehicle speed is shown as an example of the energy consumption related information.

In step S5, the energy consumption related information correction unit 107 acquires the own vehicle traveling characteristic information of the road category set for each of the traveling sections from the own vehicle traveling characteristic information storage unit 105 (the own vehicle traveling characteristic information acquired by the own vehicle traveling characteristic information acquisition unit 104 in advance is stored in the own vehicle traveling characteristic information storage unit 105 for each road category). As shown in FIG. 4, examples of the own vehicle traveling characteristic information include the own vehicle average vehicle speed information indicating the average vehicle speed of the own vehicle 1, the own vehicle acceleration dispersion information indicating the acceleration dispersion value of the own vehicle 1, and the own vehicle stop state information indicating the frequency of the stops of the own vehicle 1.

In step S6, the general vehicle traveling characteristic statistical information acquisition unit 106 acquires the general vehicle traveling characteristic statistical information of the road category set for each of the traveling sections from the general vehicle traveling characteristic statistical information database 31 of the information server 3. The general vehicle traveling characteristic statistical information acquired by the general vehicle traveling characteristic statistical information acquisition unit 106 is sent to the energy consumption related information correction unit 107.

When the processing of steps S4 to S6 is completed, the energy consumption related information correction unit 107 compares the own vehicle traveling characteristic information and the general vehicle traveling characteristic statistical information of each road category, obtains a difference between the traveling characteristics of the own vehicle 1 and the traveling characteristics (the average traveling characteristics of the plurality of general vehicles 2) of the general vehicles 2, and corrects based on the difference the energy consumption related information of each of the traveling sections acquired by the energy consumption related information acquisition unit 103 (step S7). That is to say, the energy consumption related information correction unit corrects the contents of the energy consumption related information of each of the traveling sections so as to make the contents approximated to the traveling characteristics of the own vehicle 1.

For example, in the case where the own vehicle acceleration dispersion information is larger than the average value which the general vehicle acceleration dispersion statistical information indicates (in the case where the acceleration dispersion value of the own vehicle 1 is larger than the average acceleration dispersion value of the plurality of general vehicles 2), the energy consumption related information correction unit 107 corrects the energy consumption related information so as to increase the dispersion value of the vehicle speed in the estimated speed information as shown in FIG. 4. Specifically, the energy consumption related information correction unit increases the absolute value of the gradient of the vehicle speed variation in the estimated speed information, increases the frequency of the vehicle speed variation, or increases the amplitude of the vehicle speed variation.

On the contrary, in the case where the own vehicle acceleration dispersion information is smaller than the average value which the general vehicle acceleration dispersion statistical information indicates (in the case where the acceleration dispersion value of the own vehicle 1 is smaller than the average acceleration dispersion value of the plurality of general vehicles 2), the energy consumption related information correction unit 107 corrects the energy consumption related information so as to reduce the dispersion value of the vehicle speed in the estimated speed information. Specifically, the energy consumption related information correction unit reduces the absolute value of the gradient of the vehicle speed variation in the estimated speed information, reduces the frequency of the vehicle speed variation, or reduces the amplitude of the vehicle speed variation.

Moreover, in a case where it is determined that the frequency of the stops of the own vehicle 1 is higher than the average frequency of the stops of the plurality of general vehicles 2 as a result of comparing the own vehicle stop state information and the general vehicle stop state statistical information, the energy consumption related information correction unit corrects the energy consumption related information so as to increase the number of times the vehicle speed in the estimated speed information becomes 0. On the contrary, in a case where it is determined that the frequency of the stops of the own vehicle 1 is lower than the average frequency of the stops of the plurality of general vehicles 2, the energy consumption related information correction unit corrects the energy consumption related information so as to reduce the number of times the vehicle speed in the estimated speed information becomes 0.

Moreover, in a case where it is determined that the average vehicle speed of the own vehicle 1 is higher than the average vehicle speed of the plurality of general vehicles 2 as a result of comparing the own vehicle average vehicle speed information and the general vehicle average vehicle speed statistical information, the energy consumption related information correction unit corrects the energy consumption related information so as to increase the vehicle speed in the estimated speed information. On the contrary, in a case where it is determined that the average vehicle speed of the own vehicle 1 is lower than the average vehicle speed of the plurality of general vehicles 2, the energy consumption related information correction unit corrects the energy consumption related information so as to reduce the vehicle speed in the estimated speed information.

As a result of the correction processing for the energy consumption related information in step S7, the corrected energy consumption related information of each of the traveling sections becomes approximated to the actual traveling characteristics of the own vehicle 1.

When the correction processing for the energy consumption related information of each of the traveling sections is completed, the energy consumption amount computing unit 108 calculates the energy consumption amount (required traveling energy amount) required for the own vehicle 1 to completely travel through each of the traveling sections (step S8). The required traveling energy amount of each of the traveling sections is calculated from the corrected energy consumption related information and the specification information (a vehicle weight, a traveling resistance coefficient and the like) of the own vehicle 1 by using the physical formula, the conversion formula, the data map and the like.

Subsequently, the control plan production unit 109 determines in which operation mode the own vehicle 1 travels in each of the traveling sections, that is, which of the plurality of energy sources of the own vehicle 1 is to be reserved in the required traveling energy amount in each of the traveling sections (step S9).

In this preferred embodiment, the following six operation modes are assumed as the operation modes of the own vehicle 1: an "EV (Electric Vehicle) mode" to travel by motor drive using stored electric power; an "engine mode" to travel only by the engine using fuel as the energy source; an "HEV (Hybrid Electric Vehicle) mode" to travel by both of the motor and the engine; an "engine plus electricity generation mode" in which electric power obtained by rotating the electric generator by the engine is stored; a "regeneration mode" in which electricity is generated by using kinetic energy on a downhill and during deceleration; and a "coast mode" to travel by inertia.

In the "EV mode," the required traveling energy amount is all met by electric power, and accordingly, the fuel consumption amount is 0, and the electric power consumption amount can be obtained as a value obtained by dividing the required traveling energy amount by efficiency of the motor or an inverter. The efficiency of the motor or the inverter may be obtained from the physical formula or may be obtained from the data map.

In the "engine mode," the required traveling energy amount is all met by fuel, and accordingly, the electric power consumption amount is 0, and the fuel consumption amount can be calculated by using a fuel consumption rate map referred to as BSFC (Brake Specific Fuel Consumption) that represents a relationship between, for example, the torque, number of revolutions and output of the engine and the fuel consumption amount.

In the "HEV mode," the required traveling energy amount is met by a combination of the electric power and the fuel. For example, the output of the engine is set at a value at which the torque and number of revolutions of the engine achieve the highest efficiency in the BSFC, and the output of the motor is set so as to meet the energy amount that compensates for shortage caused by using only the output the engine. In this case, the fuel consumption amount can be calculated by using the BSFC from the torque, number of revolutions and output of the engine set as described above. Moreover, the electric power consumption amount can be obtained by subtracting the energy amount to be output by the engine from the required traveling energy amount, and dividing the resultant value by the efficiency of the motor or the inverter.

In the "engine plus electricity generation mode," the output of the engine is set at a value at which the torque and the number of revolutions achieve the highest efficiency, and in addition, electricity is generated by excess engine output. Hence, the fuel consumption amount can be calculated by using the BSFC from the torque, number of revolutions and output of the engine set as described above. Moreover, the electric power consumption amount can be obtained as a value obtained by multiplying a negative value corresponding to the electric power amount which can be generated by the excess engine output by the efficiency of the electric generator or the inverter.

In the "regeneration mode," output of the engine and the motor is 0, and only electric power regeneration is performed. Hence, the fuel consumption amount is 0, and the electric power consumption amount can be obtained as a negative value corresponding to the amount of electricity generated by the regenerative brake using the motor. Note that the amount of electricity generated by the regenerative brake can be calculated in the same method as that of the "EV mode"; however, in this case, positive/negative values and multiplication/division by the efficiency are the opposite.

In the "coast mode," since output of the engine and motor is 0 and no electric power regeneration is performed, the electric power consumption amount and the fuel consumption amount each become 0.

The control plan production unit 109 determines the assignment of the operation mode of each of the traveling sections such that the fuel consumption amount and the electric power consumption amount on the entire traveling route of the own vehicle 1 satisfy a predetermined condition. However, it is necessary to conform to a restriction for each characteristic and operation mode of the vehicle (for example, the capacity of a fuel tank, the capacity of a storage battery, a rating value, a speed range in which the vehicle can travel in each operation mode, and the like), and accordingly, there is also considered a case where it is impossible to assign a specific operation mode depending on the traveling sections. The assignment of the operation modes is performed so as to conform to such a restriction and satisfy the predetermined condition.

A method of determining the assignment of the operation modes may be a method of comparing in round-robin fashion the operation modes assignable to the respective traveling sections, or may be a method generally known as a solution of a so-called "combination optimization problem." The assignment of the operation mode of each of the traveling sections determined as described above becomes the control plan for the vehicle instruments 120.

When the own vehicle 1 starts to travel after the creation of the control plan for the vehicle instruments 120 is completed, the vehicle instrument control unit 110 controls the vehicle instruments 120 based on the control plan (step S10). Specifically, the vehicle instrument control unit 110 recognizes in which traveling section on the traveling route the own vehicle 1 is located, based on the current position of the own vehicle 1 acquired by the current position acquisition unit 111, and operates the vehicle instruments 120 in the operation mode assigned to that traveling section. When the own vehicle 1 enters a new traveling section (passes through a boundary between the traveling sections), the vehicle instrument control unit 110 switches the operation modes of the own vehicle 1 as necessary.

In a case where the own vehicle 1 has completely travel through the traveling route (YES in step S11), the vehicle instrument control unit 110 ends the flow of FIG. 3; however in a case where the own vehicle has not completely travel through the traveling route (NO in step S11), the control plan production unit 109 confirms whether or not it is necessary to re-produce the control plan for the vehicle instruments 120 (step S12).

Even when the switching between the operation modes of the vehicle instruments 120 is performed according to the control plan, a difference between the energy consumption plan (the estimated value of the energy consumption amount) calculated in step S8 and the actual energy consumption amount (the actually measured value of the energy consumption amount) may occur during the traveling of the own vehicle 1. This is because, for example, there may be a case where the vehicle cannot travel at a planned speed due to unexpected traffic congestion, or a case where the operation mode is not maintained according to the control plan due to a driver's operation. Even in the traveling section in the "coast mode" or the "regeneration mode" in which it is assumed that output of the engine and motor is 0, it is well considered that the driver operates the accelerator pedal or brake pedal of the own vehicle 1 corresponding to an actual traffic condition. Moreover, such a difference may also occur in a case where the own vehicle 1 deviates from the planned traveling route.

In order to recognize such a deviation from the energy consumption plan, the control plan production unit 109 computes a difference between the estimated value and the actually measured value of the energy consumption amount. Specifically, for example, the control plan production unit computes each of a difference between a fuel consumption amount measured by a controller for engine control and an estimated value of the fuel consumption amount calculated in advance, and a difference between an electric power consumption amount measured by a controller for motor control and an estimated value of the electric power consumption amount calculated in advance.

In a case where a magnitude or variation of each of the differences exceeds a predetermined threshold, in a case where there is a change in the traveling route because the own vehicle 1 deviates from the traveling route, or in a case where the user issues an instruction, the control plan production unit 109 determines that it is necessary to re-produce the control plan for the vehicle instruments 120 (YES in step S12), and returns to step S1 in order to re-produce the control plan. In this case, only necessary processing in the processing in steps S1 to S8 just needs to be performed. For example, when the own vehicle 1 does not deviate from the traveling route, there is no change in the traveling route, and accordingly, the search for the traveling route (step S1) can be omitted.

Meanwhile, in a case where it is determined that it is not necessary to re-produce the control plan for the vehicle instruments 120 (NO in step S12), the vehicle instrument control unit 110 determines whether or not the feedback control for the vehicle instruments 120 is necessary (step S13). Specifically, when a difference between the estimated value and the actually measured value of the energy consumption amount obtained in step S8 exceeds a predetermined magnitude range, it is determined that the feedback control is necessary.

In a case of determining that the feedback control for the vehicle instruments 120 is necessary (YES in step S13), the vehicle instrument control unit 110 corrects the operation mode parameters (an output ratio of the engine and the motor, intensity of the electric power regeneration, and the like) so as to reduce the difference between the estimated value and the actually measured value of the energy consumption amount, and thereby performs the feedback control (step S14).

The operations in steps S10 to S14 are repeatedly executed until the own vehicle 1 completely travels through the traveling route.

As described above, in accordance with the vehicle energy management device 100 according to the preferred embodiment, the energy consumption related information is corrected based on the result of comparing the own vehicle traveling characteristic information and the general vehicle traveling characteristic statistical information, and accordingly, the corrected energy consumption related information conforms to the actual traveling characteristics of the own vehicle 1. Hence, highly accurate energy control corresponding to the characteristics for each driver of the own vehicle 1 becomes possible, and the difference between the estimated value and the actually measured value of the energy consumption amount becomes small and accordingly, it is possible to contribute to further reduction of the energy consumption amount.

Moreover, the general vehicle traveling characteristic statistical information is the statistical result (the average value, the dispersion value and the like) obtained by statistically processing the traveling characteristic information of a large number of the general vehicles 2, and the data amount thereof is small. Therefore, in comparison with the method of accumulating the information acquired from the large number of general vehicles 2, the data amount is reduced to a large extent. Hence, it can be said that a feasibility of the improvement of the infrastructure such as the information server 3 including the general vehicle traveling characteristic statistical information database 31 necessary for the vehicle energy management system according to the present invention is high.

While the invention has been shown and described in detail, the foregoing description is in all aspects illustrative and not restrictive. It is therefore understood that numerous modifications and variations can be devised without departing from the scope of the invention.

What is claimed is:

1. A vehicle energy management device used in a vehicle including a plurality of vehicle instruments driven by different energy sources, the vehicle energy management device comprising:
    a processor to execute a software program; and
    a memory to store the program which, when executed by the processor, performs processes of:
        calculating a traveling route of said vehicle;
        dividing said traveling route into a plurality of traveling sections, and setting for each of the traveling sections a road category corresponding to road characteristics of each of the traveling sections;
        acquiring energy consumption related information that is information related to energy consumption of said vehicle in each of the traveling sections;
        acquiring own vehicle traveling characteristic information that is an actually measured value of traveling characteristics when said vehicle travels on a road of each road category and general vehicle traveling characteristic statistical information that is a statistical result acquired by statistically processing traveling characteristics of a plurality of general vehicles for each road category when the plurality of general vehicles travels on the road of each road category, and correcting said energy consumption related information of each of the traveling sections based on a result of comparing said own vehicle traveling characteristic information and said general vehicle traveling characteristic statistical information of each of the traveling sections;
        calculating an estimated value of an energy consumption amount by each of said plurality of vehicle instruments when said vehicle travels in each of the traveling sections, based on said corrected energy consumption related information;
        producing a control plan for said plurality of vehicle instruments for each of the traveling sections based on the estimated value of the energy consumption amount by each of said plurality of vehicle instruments in each of the traveling sections; and
        controlling said plurality of vehicle instruments according to said control plan.

2. The vehicle energy management device according to claim 1, wherein
    said general vehicle traveling characteristic statistical information is acquired from a storage device mounted on said vehicle.

3. The vehicle energy management device according to claim 1, wherein
    said general vehicle traveling characteristic statistical information is acquired from an information server outside of said vehicle.

4. The vehicle energy management device according to claim 1, wherein
    said processor obtains a difference between the traveling characteristics of said vehicle and an average value or median value of the traveling characteristics of said plurality of general vehicles from said own vehicle traveling characteristic information and said general vehicle traveling characteristic statistical information, and corrects said energy consumption related information based on the difference.

5. The vehicle energy management device according to claim 1, wherein
    said own vehicle traveling characteristic information includes one or more of own vehicle average vehicle speed information indicating an average vehicle speed of said vehicle, own vehicle acceleration dispersion information indicating a dispersion value of acceleration of said vehicle, and own vehicle stop state information indicating a frequency or number of stops of said vehicle, and
    said general vehicle traveling characteristic statistical information includes one or more of general vehicle average vehicle speed statistical information indicating a statistical result of an average vehicle speed for said plurality of general vehicles, general vehicle acceleration dispersion statistical information indicating a statistical result of a dispersion value of acceleration for said plurality of general vehicles, and general vehicle stop state statistical information indicating a statistical result of a frequency or number of stops for said plurality of general vehicles.

6. The vehicle energy management device according to claim 5, wherein
    said own vehicle traveling characteristic information includes said own vehicle acceleration dispersion information,
    said general vehicle traveling characteristic statistical information includes said general vehicle acceleration dispersion statistical information, and
    said own vehicle acceleration dispersion information and said general vehicle acceleration dispersion statistical information are defined while being classified for vehicle speed ranges.

7. The vehicle energy management device according to claim 5, wherein
    said own vehicle traveling characteristic information includes said own vehicle acceleration dispersion information,
    said general vehicle traveling characteristic statistical information includes said general vehicle acceleration dispersion statistical information, and said own vehicle acceleration dispersion information and said general vehicle acceleration dispersion statistical information are defined without being classified for vehicle speed ranges.

8. The vehicle energy management device according to claim 5, wherein
said own vehicle traveling characteristic information includes said own vehicle average vehicle speed information indicating an average vehicle speed of said vehicle,
said general vehicle traveling characteristic statistical information includes said general vehicle average vehicle speed statistical information indicating a statistical result of an average vehicle speed for said plurality of general vehicles,
said average vehicle speed of said vehicle is an average value of a vehicle speed of said vehicle calculated while excluding a stop state, and
said average vehicle speed of a general vehicle is an average value of a vehicle speed of the general vehicle calculated while excluding a stop state.

9. The vehicle energy management device according to claim 5, wherein
said own vehicle traveling characteristic information includes said own vehicle average vehicle speed information indicating an average vehicle speed of said vehicle,
said general vehicle traveling characteristic statistical information includes said general vehicle average vehicle speed statistical information indicating a statistical result of an average vehicle speed for said plurality of general vehicles,
said average vehicle speed of said vehicle is an average value of a vehicle speed of said vehicle calculated while including a stop state, and
said average vehicle speed of a general vehicle is an average value of a vehicle speed of the general vehicle calculated while including a stop state.

10. The vehicle energy management device according to claim 1, wherein
said processor divides said traveling route into said plurality of traveling sections by dividing said traveling route for each of road characteristics, dividing said traveling route for each of fixed distances, dividing said traveling route for each of estimated traveling distances during a fixed time, dividing said traveling route by branch points of the road, dividing said traveling route based on said energy consumption related information on said traveling route, dividing said traveling route based on said general vehicle traveling characteristic statistical information on said traveling route, dividing said traveling route for different time periods when said vehicle travels, and dividing said traveling route according to weather when said vehicle travels.

11. The vehicle energy management device according to claim 10, wherein,
in the dividing said traveling route for each of said road characteristics, said road characteristics are defined by any of a type, altitude and gradient of a road, a road width, curvature of a curve, presence of a branch point, an estimated vehicle speed range, a time period during a traveling time, weather during a traveling time, said energy consumption related information, and said general vehicle traveling characteristic statistical information.

12. The vehicle energy management device according to claim 1, wherein
said road characteristics as said road category are defined by any of a type, altitude and gradient of a road, a road width, curvature of a curve, presence of a branch point, an estimated vehicle speed range, a time period during a traveling time, weather during a traveling time, said energy consumption related information, and said general vehicle traveling characteristic statistical information.

13. The vehicle energy management device according to claim 1, wherein
said energy consumption related information includes any of road characteristic information, congestion information, vehicle speed information indicating a flow of a vehicle, weather information, and supply and demand information of an energy network of an infrastructure.

14. The vehicle energy management device according to claim 1, wherein
said energy consumption related information includes vehicle speed information indicating a flow of a vehicle, and
said processor corrects said energy consumption related information by changing one or more of a gradient of vehicle speed variation in said vehicle speed information, a frequency of the vehicle speed variation, an amplitude of the vehicle speed variation, and a frequency of stops of a vehicle.

15. The vehicle energy management device according to claim 1, wherein
a plurality of operation modes each of which uses one or more of said plurality of vehicle instruments is defined,
said processor calculates the estimated value of the energy consumption amount by each of said plurality of vehicle instruments for each of the traveling sections when said vehicle travels in each of the operation modes, and
said processor determines each of the operation modes assigned to each of the traveling sections based on the estimated value of the energy consumption amount by each of said plurality of vehicle instruments for each of said traveling sections such that the energy consumption amount by each of said plurality of vehicle instruments on said entire traveling route satisfies a predetermined condition.

16. The vehicle energy management device according to claim 1, wherein
said plurality of vehicle instruments includes an engine that uses fuel as an energy source, a motor that uses electric power as an energy source, and an electric generator that generates electricity by using output of said engine or kinetic energy of said vehicle.

* * * * *